United States Patent [19]

Shimizu et al.

[11] Patent Number: 4,591,391
[45] Date of Patent: May 27, 1986

[54] METHOD FOR REMOVING POLYMER SCALE DEPOSITED ON REACTOR WALLS AND A POLYMER SCALE REMOVER AGENT THEREFOR

[75] Inventors: Toshihide Shimizu, Chiba; Ichiro Kaneko; Yoshiteru Shimakura, both of Ibaraki, all of Japan

[73] Assignee: Shin-Etsu Chemical Co., Ltd., Tokyo, Japan

[21] Appl. No.: 711,036

[22] Filed: Mar. 12, 1985

Related U.S. Application Data

[63] Continuation of Ser. No. 596,267, Apr. 3, 1984, abandoned.

[30] Foreign Application Priority Data

Apr. 4, 1983 [JP] Japan ................................. 58-59032
Jun. 20, 1983 [JP] Japan ................................ 58-110606

[51] Int. Cl.$^4$ ............................................. B08B 9/00
[52] U.S. Cl. ............................. 134/22.17; 134/22.19; 134/28; 134/29; 252/144; 252/159; 252/163; 252/164; 252/165
[58] Field of Search ............... 134/4, 38, 22.17, 22.19, 134/28, 29; 252/144, 159, 163, 164, 165, DIG. 8

[56] References Cited

U.S. PATENT DOCUMENTS

| T957,003 | 4/1977 | Freshour | 134/38 X |
|---|---|---|---|
| 3,356,614 | 12/1967 | Gilbert | 134/38 X |
| 3,574,123 | 4/1971 | Laugle | 134/38 X |
| 3,619,295 | 11/1971 | Nishizaki et al. | 134/38 X |
| 3,954,648 | 5/1976 | Belcak et al. | 134/38 X |
| 4,274,884 | 6/1981 | Cartwright | 134/38 X |
| 4,370,174 | 1/1983 | Braithwaite | 134/38 X |

Primary Examiner—Arthur L. Corbin
Attorney, Agent, or Firm—Toren, McGeady, Stanger, Goldberg & Kiel

[57] ABSTRACT

The invention provides an efficient method for removing polymer scale deposited on the walls of the polymerization reactor after completion of a polymerization run of an ethylenically unsaturated monomer, e.g. vinyl chloride, in an aqueous medium. The polymer scale adhering to the walls is soaked with a scale-remover solution containing a soluble cellulose derivative, such as ethyl cellulose, hydroxypropyl methyl cellulose and the like, applied thereto and, after standing as wet for a while, washed down easily with water. Certain additives to the solution, e.g. acids, alkalis, paraffins and emulsifying agents, may further enhance the effectiveness of the remover solution.

11 Claims, No Drawings

METHOD FOR REMOVING POLYMER SCALE DEPOSITED ON REACTOR WALLS AND A POLYMER SCALE REMOVER AGENT THEREFOR

This is a continuation of application Ser. No. 596,267, filed Apr. 3, 1984, now abandoned.

BACKGROUND OF THE INVENTION

The present invention relates to a method for removing polymer scale deposited on the reactor walls after completion of a polymerization run and a polymer scale remover agent used therefor.

As is known, several different processes are known and practiced in the polymerization of an ethylenically unsaturated monomer or, in particular, vinylic monomer including suspension and emulsion polymerization methods carried out in an aqueous medium, solution polymerization, vapor phase polymerization and bulk polymerization. One of the most serious problems in either one of these polymerization methods is the deposition of polymer scale on the inner walls of the polymerization reactor, stirrer blades and shaft and other surfaces coming into contact with the monomer under polymerization. Deposition of polymer scale is very disadvantageous in several ways that the yield of the polymer product is decreased so much, cooling capacity of the polymerization reactor is reduced due to the poor heat conduction of the scale layer and the quality of the polymer product is degraded due to the possible intermixing of the scale coming off the reactor walls with the product. Therefore, polymer scale deposited on the reactor walls and other parts coming into contact with the monomer should be removed as completely as possible after each polymerization run but such a work for scale removal requires too much labor and time to be economical and, to be worse, involves a further serious problem on the workers' health because polymer scale usually contains a considerably large amount of the unreacted monomer absorbed therein while some of the monomers such as vinyl chloride, acrylonitrile and the like are notoriously toxic to the human body as is a serious public concern in recent years.

Accordingly, several methods have been proposed in which the polymer scale on the reactor walls can be removed without a worker working inside the reactor including a method in which an organic solvent under circulation is sprayed with pressurization at the polymer scale on the reactor walls or the reactor is filled with an organic solvent to dip the polymer scale therein (see, for example, Japanese Patent Publications 46-41366 and 47-19896) and a method in which pressurized water is sprayed at the polymer scale. The methods of using an organic solvent is economically disadvantageous because a quite large volume of the organic solvent is required for the method. In addition, there is a problem of possible pollution of the working environments due to the solvent vapor when an organic solvent at an elevated temperature is used with an object to improve the scale removing effect. The method for the mechanical removal of the polymer scale by use of pressurized water is also disadvantageous because the method is not labor saving requiring a quite long time for complete removal of the polymer scale and the method involves some danger to workers.

SUMMARY OF THE INVENTION

An object of the present invention is therefore to provide a novel and improved method for complete removal of polymer scale deposited on the reactor walls and other surfaces coming into contact with the monomer in the polymerization of an ethylenically unsaturated monomer free from the problems and disadvantages in the prior art methods.

Another object of the invention is to provide a novel remover agent used for the removal of polymer scale deposited on the reactor walls following a polymerization run.

Thus, the method of the present invention for the removal of polymer scale from the reactor walls and other surfaces comprises applying a solution containing a soluble cellulose derivative dissolved therein to the polymer scale on the reactor walls and washing down the polymer scale. The cellulose derivative suitable for use is exemplified by methyl cellulose, ethyl cellulose, hydroxypropyl methyl cellulose, hydroxypropyl cellulose, carboxymethyl cellulose, carboxyethyl cellulose, nitrocellulose, cellulose acetate and the like.

The remover solution may additionally contain an acid, alkali, paraffin or emulsifying agent.

According to the above described inventive method, any firmly adherent polymer scale can be removed completely within a relatively short time by use of a relatively small volume of the remover solution without a worker working inside the polymerization reactor which can be cleaned up as tightly closed.

DETAILED DESCRIPTION OF THE PREFERRED EMBODIMENTS

The remover solution used in the inventive method contains a soluble cellulose derivative as an essential ingredient dissolved in a solvent with optional admixture of an acid, alkali, paraffin and emulsifying agent. It is a requirement for the solvent, of course, that the solvent has a power of dissolving these solute materials. It is also desirable that the solvent or at least a component of the solvent mixture, when two or more kinds of solvents are used in combination, is a good solvent for the polymer deposited as the scale on the reactor walls to be removed. A good solvent may be used as admixed with a poor solvent to the polymer.

The good solvent here implied is a solvent having affinity to the polymer deposited as the scale while poor solvent is a solvent having no affinity to the polymer. A guide for the differentiation of a good solvent and a poor solvent is obtained from J. Brandrup and E. H. Immergut, "Polymer Handbook", 1967, pages IV-185 to IV-234 in which various solvents are classified into good and poor solvents for each of a number of polymers. For example, Table 1 given later names the good and poor solvents for a copolymer of butadiene, styrene and acrylic acid prepared in Experiments No. 1 to No. 17 and forming the polymer scale deposited on the walls and also names the good and poor solvents for a graft copolymer of styrene and acrylonitrile on the base polymer of a polybutadiene prepared in Experiments No. 18 to No. 28. Further, Table 1 names the respective solvents for polyvinyl chloride prepared in Experiments No. 29 to No. 40 and forming the polymer scale and also names the respective solvents for a copolymer of acrylic acid and an acrylic acid ester in Experiments No. 41 to No. 50.

As is mentioned above, the solvent used for the preparation of the remover solution may be a good solvent or a mixture of two kinds or more of good solvents for the polymer. It is preferable, however, that the remover solution is prepared by use of a solvent mixture composed of one kind or more of good solvents and one kind or more of poor solvents in order to obtain further increased power of the remover for the removal of the polymer scale.

The soluble cellulose derivatives to be dissolved in the above described solvent or solvent mixture are exemplified by methyl cellulose, ethyl cellulose, hydroxypropyl cellulose, hydroxypropyl methyl cellulose, carboxymethyl cellulose, carboxyethyl cellulose, nitrocellulose, cellulose acetate and the like. The concentration of these cellulose derivatives in the remover solution should preferably be sufficient to give a viscosity of the solution of at least 3 centipoise or, more preferably, at least 10 centipoise at 20° C. as measured with a rotational viscometer. When the viscosity of the remover solution is lower than 3 centipoise at 20° C., no satisfactory results may be obtained in the removal of the polymer scale by use of the remover solution.

The first step of the inventive method is the application of the thus prepared remover solution to the polymer scale deposited on the reactor walls and surfaces of other parts such as the stirrer and desired to be removed to cause permeation thereinto. The method of application is not particularly limitative so that any method such as spraying, brushing and the like may be used. The amount of application of the remover solution should be in the range from 0.1 to 500 g/m² or, preferably, from 10 to 100 g/m². When the amount of application of the remover solution is too small, no satisfactory effect of polymer scale removal can be obtained as a matter of course while no additional advantages can be obtained by increasing the amount of application of the remover solution in excess of 500 g/m² only to cause futile consumption of time, labor and material. Application of the remover solution should be followed by standing the thus wetted polymer scale as such, usually, for 5 to 30 minutes with an object to obtain full permeation of the solution through the layer of the polymer scale.

After the application of the remover solution to the polymer scale and full permeation therethrough, the polymer scale is washed down off the walls, usually, with water as the washing liquid. It is optional that the washing liquid is an alcoholic solvent or a mixture of water and an alcohol according to need.

Although quite satisfactory results can be obtained in most cases for the removal of polymer scale deposition by use of a remover solution containing a single solute of the soluble cellulose derivative described above, it is sometimes more advantageous to use a remover solution containing an additional ingredient such as an acid, alkali, paraffin and emulsifying agent exhibiting a remarkably enhanced power for the removal of polymer scale.

The acid usable for such a purpose is an organic acid exemplified by formic acid, acetic acid, propionic acid, salicylic acid, butyric acid, benzoic acid, cinnamic acid, monochloroacetic acid, dichloroacetic acid, trichloroacetic acid and the like. The alkaline substance usable for the same purpose is an inorganic alkali exemplified by ammonia, sodium hydroxide, potassium hydroxide and the like or an organic basic compound exemplified by monoethanolamine, diethanolamine, triethanolamine, ethyl ethanolamine, dimethyl ethanolamine, acetyl ethanolamine, aminoethyl ethanolamine, diisopropyl ethanolamine, monoisopropanolamine, diisopropanolamine, triisopropanolamine, ethylene diamine, monoethylamine, diethylene triamine, cyclohexyl amine, monomethyl amine, hydrazine, diallyl amine and the like. These acids or alkalis should be contained in the remover solution in a concentration in the range from 0.1 to 15% by weight when certain significant effect is desired in the effectiveness for the polymer scale removal.

A further additive added optionally to the remover solution is a paraffin which may be liquid paraffin or a solid paraffin having from 16 to 40 carbon atoms per molecule and exhibiting a melting point in the range from 40° to 75° C. The paraffin added to the remover solution has an effect to retard the vaporization of the solution applied to the polymer scale so that the permeation of the remover solution through the polymer scale layer is accelerated and the time of keeping the polymer scale wet with the remover solution can be shortened before washing down. The amount of the paraffin should be 1% by weight or smaller of the remover solution and any smaller amount may be effective in its own way.

Another ingredient further optionally added to the remover solution is an emulsifying agent which is preferably an anionic surface active agent such as sodium oleate, ammonium laurylsulfate, sodium dodecylbenzene sulfonate, sodium dialkylsulfosuccinates, sodium polyoxyethylene alkyl phenol ether sulfates and the like, a non-ionic surface active agent such as polyoxyethylene lauryl ether, polyoxyethylene nonyl phenyl ether, polyoxyethylene sorbitan monolaurate, polyethyleneglycol monolaurate and the like or a cationic surface active agent such as laurylamine acetate, lauryl trimethyl ammonium chloride and the like. The emulsifying agent has an effect to facilitate washing down of the polymer scale after full permeation of the remover solution through the polymer scale layer. In particular, addition of an emulsifying agent is desirable when a paraffin is added to the solution as an optional additive ingredient since an emulsifying agent in the solution ensures complete removal of the paraffin remaining on the reactor walls so tbat fully cleaned surfaces of the reactor walls can be readily obtained thereby. The amount of the emulsifying agent in the remover solution should be 5% by weight or smaller and any smaller amount may be effective in its own way.

The paraffin and emulsifying agent are not essential in the remover solution used in the inventive method but addition of at least either one of them or both, if possible, is desirable when the above described advantages should be obtained.

The method of the present invention is applicable to the polymerization of various kinds of ethylenically unsaturated monomers including vinylic monomers in the process of suspension polymerization, emulsion polymerization. bulk polymerization and others. The monomers subjected to the polymerization followed by the removal of the polymer scale deposited on the reactor walls according to the inventive method are exemplified by vinyl halides such as vinyl chloride, vinyl esters such as vinyl acetate and vinyl propionate, acrylic and methacrylic acids and esters and salts thereof, maleic and fumaric acids and esters thereof and maleic anhydride, dienic monomers such as butadiene, chloroprene and isoprene, styrene, acrylonitrile, vinylidene halides, vinyl ethers and the like.

The method of the present invention is particularly satisfactorily applied to the preparation of a polymer or copolymer of a monomer or monomers including vinyl halides such as vinyl chloride, vinylidene halides, styrene, acrylonitrile, methyl methacrylate, butadiene and vinyl acetate as well as a monomer mixture mainly composed of one or more of these monomers by the suspension polymerization or emulsion polymerization in a stainless steel-made or glass-lined polymerization reactor to be followed by the removal of polymer scale from the reactor walls.

It is usual that the polymer scale deposited on the reactor walls in the above mentioned suspension polymerization or emulsion polymerization carried out in an aqueous medium contains, for example, about 25 to 35% by weight of water as left on the reactor walls after discharge of the slurried polymerizate out of the reactor. It was found that, when the remover solution was applied according to the invention to the polymer scale containing such a large amount of water, the results obtained by the inventive method were not always quite satisfactory and very reliable results could be obtained when the remover solution was applied to the polymer scale after the water content of the polymer scale had been reduced not to exceed 20% by weight or, preferably, 15% by weight by drying with heating, preferably, at a temperature of 40° to 90° C. under air circulation. Meanwhile, the application of the remover solution to the polymer scale deposited on the reactor walls may be performed at any temperature of the reactor walls from room temperature to 90° C.

As is understood from the above description, the industrial advantages of the inventive method are very great since the otherwise troublesome works of polymer scale removal can be readily completed within a short time by the application of the quite inexpensive remover solution to the polymer scale followed by a simple washing down of the polymer scale with water contributing to a great reduction of a cycle time for the polymerization runs repeated in a polymerization reactor.

Following are the examples to illustrate the method of the present invention in more detail.

In the tables accompanying the following Examples, each of the solvents and solutes in the remover solutions is denoted by the respective chemical formula or abridgment using the symbols of Me, Et and Ph for methyl, ethyl and phenyl groups, respectively. The notations are as follows.

$CH_2Cl_2$: methylene chloride; PhMe: toluene; TCE: 1,1,2-trichloroethane; MIBK: methyl isobutyl ketone; EDC: ethylene dichloride; $C_6H_6$ benzene; MEK: methyl ethyl ketone; THF: tetrahydrofuran; CHN: cyclohexanone; TCE: 1,1,1-trichloroethane; MeOH: methyl alcohol; n-$C_7H_{16}$: n-heptane; EtOH: ethyl alcohol; IPA: isopropyl alcohol; PhOH: phenol; MC: methyl cellulose; EC: ethyl cellulose; HPC: hydroxypropyl cellulose; HPMC: hydroxypropyl methyl cellulose; NC: nitrocellulose; CEC: carboxyethyl cellulose; CA: cellulose acetate; HCOOH: formic acid; Cl-AcOH: monochloroacetic acid; AcOH: acetic acid; MEA: monoethanolamine; EDA: ethylene diamine; $NH_4OH$: ammonia; NaOH: sodium hydroxide; MMA: monomethylamine; MIPA: monoisopropanolamine; DBS-Na: sodium dodecylbenzene sulfonate; LSA: ammonium laurylsulfate; DAS-Na: sodium dialkylsulfosuccinate; and LS-Na: sodium laurylsulfate.

EXAMPLE 1

(Experiments No. 1 to No. 17)

Into a stainless steel-made polymerization reactor of 100-liter capacity equipped with a stirrer were introduced 40 kg of deionized water, 10 kg of 1,3-butadiene monomer, 10 kg of styrene, 400 g of acrylic acid, 600 g of sodium lauryl sulfate, 500 g of tert-dodecyl mercaptan and 100 g of potassium persulfate and polymerization of the monomers was performed under agitation at 60° C. for 8 hours. After completion of the polymerization, the polymerizate slurry was discharged out of the reactor and the polymer scale deposited on the reactor walls was dried by heating with hot water at 80° C. passed through the jacket of the reactor followed by cooling to room temperature and application of a scale remover solution prepared according to one of the formulations shown in Table 1 below in a coating amount of 50 g/m². After standing for a length of time as shown in the table, the polymer scale was washed down with water and the amount of the polymer scale left unremoved on the reactor walls was determined to give the results shown in the table which also gives the water content of the polymer scale prior to the application of the remover solution determined on a balance with an infrared heating means.

EXAMPLE 2

(Experiments No. 18 to No. 28)

Into a stainless steel-made polymerization reactor of 100-liter capacity equipped with a stirrer were introduced 40 kg of deionized water, 500 g of sodium oleate, 13 kg of a polybutadiene latex having a solid content of 45% by weight, 9.0 kg of styrene monomer, 5.0 kg of acrylonitrile monomer, 40 g of tert-dodecyl mercaptan and 140 g of cumene hydroperoxide followed by the temperature elevation to 65° C. and additional introduction of 200 g of glucose, 2 g of iron (II) sulfate and 100 g of sodium pyrophosphate to the polymerization mixture and the polymerization of the monomers was performed under agitation for 5 hours at 65° C.

After completion of the polymerization reaction, the polymerizate slurry was discharged out of the reactor and hot water at 60° C. was passed through the jacket to heat and dry the polymer scale deposited on the reactor walls. Under this heated and dried condition of the polymer scale, a remover solution prepared according to one of the formulations shown in Table 1 was applied to the polymer scale in a coating amount of 20 g/m² followed by standing for a length of time indicated in the table and then the polymer scale was washed down with water. Table 1 also gives the amount of the polymer scale left unremoved on the reactor walls after this washing in each Experiment.

EXAMPLE 3

(Experiments No. 29 to No. 40)

Into a stainless steel-made polymerization reactor of 100-liter capacity equipped with a stirrer were introduced 40 kg of deionized water, 2.2 kg of sodium laurylsulfate, 3.0 kg of cetyl alcohol, 20 g of α,α'-azobisdimethyl valeronitril and 20 kg of vinyl chloride monomer and the polymerization reaction was performed under agitation at 50° C. for 7 hours.

After completion of the polymerization reaction, the polymerizate slurry was discharged out of the reactor and hot water at 70° C. was passed through the jacket of the reactor to heat and dry the polymer scale deposited on the reactor walls. Under this heated and dried condition of the polymer scale, a remover solution prepared according to one of the formulations shown in Table 1 was applied to the polymer scale in a coating amount of 30 g/m² followed by standing for a length of time indicated in the table and then the polymer scale was washed down with water. Table 1 also gives the amount of the polymer scale left unremoved on the reactor walls after this washing in each Experiment.

EXAMPLE 4

(Experiments No. 41 to No. 50)

Into a stainless steel-made polymerization reactor of 100-liter capacity equipped with a stirrer were introduced 40 kg of deionized water, 5.8 kg of n-butyl acrylate, 13.6 kg of methyl methacrylate, 0.3 kg of acrylic acid, 0.3 kg of methacrylic acid, 100 g of sodium dodecylbenzene sulfonate, 700 g of polyoxyethylene nonyl phenyl ether and 20 g of ammonium persulfate followed by temperature elevation of the mixture to 60° C. and then additional introduction of 20 g of sodium hydrogensulfite and polymerization reaction was performed under agitation at 60° C. for 6 hours.

After completion of the polymerization reaction, the polymerizate slurry was discharged out of the reactor and hot water at 80° C. was passed through the jacket of the reactor to heat and dry the polymer scale deposited on the reactor walls followed by cooling to room temperature. Thereafter, a remover solution prepared according to one of the formulations shown in Table 1 was applied to the polymer scale in a coating amount of 40 g/m² followed by standing for a length of time indicated in the table and the polymer scale was washed down with water. Table 1 also gives the amount of the polymer scale left unremoved on the reactor walls after this washing in each Experiment.

EXAMPLE 5

(Experiments No. 51 to No. 63)

Into a stainless steel-made polymerization reactor of 100-liter capacity equipped with a stirrer were introduced 40 kg of deionized water, 10 kg of 1,3-butadiene monomer, 10 kg of styrene monomer, 400 g of acrylic acid, 600 g of sodium laurylsulfate, 500 g of tert-dodecyl mercaptan and 100 g of potassium persulfate and the polymerization reaction was performed under agitation at 60° C. for 8 hours.

TABLE 1

| Exp. No. | Remover solution Good solvent (A) | Poor solvent (B) | (A)/(B) weight ratio | Cellulose derivative | Viscosity at 20° C., cps | Water content in scale, % by weight | Standing time after application of remover, minutes | Scale left after washing, g/m² |
|---|---|---|---|---|---|---|---|---|
| 1 | — | — | — | — | — | 26 | — | 1050 |
| 2 | CH₂Cl₂ | — | — | — | — | 26 | 60 | 800 |
| 3 | CH₂Cl₂ | — | — | — | — | 13 | 60 | 600 |
| 4 | CH₂Cl₂ | — | — | EC | 10 | 26 | 60 | 150 |
| 5 | CH₂Cl₂ | — | — | EC | 1.5 | 13 | 60 | 200 |
| 6 | CH₂Cl₂ | — | — | EC | 3 | 13 | 60 | 50 |
| 7 | CH₂Cl₂ | — | — | EC | 5 | 13 | 60 | 20 |
| 8 | CH₂Cl₂ | — | — | EC | 100 | 13 | 60 | 10 |
| 9 | CH₂Cl₂ | — | — | EC | 1000 | 13 | 60 | 8 |
| 10 | CH₂Cl₂ | — | — | EC | 10000 | 13 | 60 | 10 |
| 11 | CH₂Cl₂ | MeOH | 90/10 | EC | 50 | 13 | 30 | 5 |
| 12 | CH₂Cl₂ | MeOH | 50/50 | EC | 50 | 13 | 30 | 4 |
| 13 | CH₂Cl₂ | MeOH | 30/70 | EC | 50 | 13 | 30 | 6 |
| 14 | PhMe | MeOH | 70/30 | HPMC | 50 | 13 | 10 | 8 |
| 15 | TCE | n-C₇H₁₆ | 50/50 | NC | 30 | 13 | 20 | 10 |
| 16 | MIBK | EtOH | 50/50 | HPC | 10 | 13 | 20 | 8 |
| 17 | EDC | MeOH | 50/50 | CEC | 10 | 13 | 20 | 7 |
| 18 | — | — | — | — | — | 27 | — | 900 |
| 19 | TCE | — | — | — | — | 11 | 60 | 600 |
| 20 | C₆H₆ | — | — | — | — | 11 | 60 | 700 |
| 21 | EDC | EtOH | 70/30 | — | — | 11 | 60 | 600 |
| 22 | TCE | — | — | EC | 80 | 11 | 60 | 10 |
| 23 | TCE | — | — | EC | 80 | 11 | 10 | 8 |
| 24 | C₆H₆ | EtOH | 70/30 | EC | 200 | 11 | 10 | 6 |
| 25 | EDC | EtOH | 70/30 | CA | 200 | 11 | 10 | 5 |
| 26 | EDC | EtOH | 70/30 | NC | 200 | 11 | 10 | 6 |
| 27 | EDC | EtOH | 70/30 | MC | 200 | 11 | 10 | 8 |
| 28 | EDC | EtOH | 70/30 | HPC | 200 | 11 | 10 | 7 |
| 29 | — | — | — | — | — | 26 | — | 1100 |
| 30 | MEK | — | — | — | — | 12 | 60 | 950 |
| 31 | THF | — | — | — | — | 12 | 60 | 900 |
| 32 | EDC | IPA | 50/50 | — | — | 12 | 60 | 800 |
| 33 | PhMe | IPA | 50/50 | — | — | 12 | 60 | 850 |
| 34 | MEK | IPA | 70/30 | MC | 300 | 12 | 60 | 8 |
| 35 | THF | IPA | 70/30 | MC | 300 | 12 | 10 | 8 |
| 36 | EDC | — | — | EC | 250 | 12 | 20 | 11 |
| 37 | EDC | IPA | 50/50 | NC | 200 | 12 | 20 | 7 |
| 38 | PhMe | IPA | 50/50 | CA | 200 | 12 | 20 | 7 |
| 39 | EDC | n-C₇H₁₆ | 80/20 | EC | 250 | 12 | 20 | 9 |
| 40 | EDC | n-C₇H₁₆ | 80/20 | HPC | 250 | 12 | 20 | 9 |
| 41 | — | — | — | — | — | 28 | — | 950 |
| 42 | CH₂Cl₂ | — | — | — | — | 12 | 60 | 850 |
| 43 | CH₂Cl₂ | MeOH | 70/30 | — | — | 12 | 60 | 700 |

TABLE 1-continued

| Exp. No. | Remover solution Good solvent (A) | Poor solvent (B) | (A)/(B) weight ratio | Cellulose derivative | Viscosity at 20° C., cps | Water content in scale, % by weight | Standing time after application of remover, minutes | Scale left after washing, g/m² |
|---|---|---|---|---|---|---|---|---|
| 44 | THF | — | — | — | — | 12 | 60 | 800 |
| 45 | CHN | — | — | — | — | 12 | 60 | 650 |
| 46 | CH₂Cl₂ | — | — | EC | 50 | 12 | 30 | 10 |
| 47 | CH₂Cl₂ | MeOH | 70/30 | HPMC | 50 | 12 | 30 | 8 |
| 48 | THF | — | — | EC | 30 | 12 | 30 | 10 |
| 49 | THF | MeOH | 70/30 | CEC | 30 | 12 | 30 | 8 |
| 50 | CHN | MeOH | 70/30 | MC | 80 | 12 | 30 | 7 |

After completion of the polymerization reaction, the polymerizate slurry was discharged out of the polymerization reactor and a remover solution prepared according to one of the formulations shown in Table 2 was applied to the polymer scale deposited on the reactor walls in a coating amount of 50 g/m² followed by standing for a length of time as indicated in the table. Thereafter, the polymer scale was washed down with water. Table 2 also gives the amount of the polymer scale left unremoved on the reactor walls after this washing in each Experiment.

EXAMPLE 6

(Experiments No. 64 to No. 75)

Into a stainless steel-made polymerization reactor of 100-liter capacity equipped with a stirrer were introduced 40 kg of deionized water, 500 g of sodium oleate, 13 kg of a polybutadiene latex having a solid content of 45%, 9.0 kg of styrene monomer, 5.0 kg of acrylonitrile monomer, 40 g of tert-dodecyl mercaptan and 140 g of cumene hydroperoxide followed by temperature elevation to 65° C. and additional introduction of 200 g of glucose, 2 g of iron (II) sulfate and 100 g of sodium pyrophosphate and polymerization reaction was performed under agitation at 65° C. for 5 hours.

After completion of the polymerization reaction, the polymerizate slurry was discharged out of the polymerization reactor and a remover solution prepared according to one of the formulations shown in Table 2 was applied to the polymer scale deposited on the reactor walls in a coating amount of 20 g/m² followed by standing for a length of time as indicated in the table and then washing down of the polymer scale with water. Table 2 also gives the amount of the polymer scale left unremoved on the reactor walls after this washing in each Experiment.

EXAMPLE 7

(Experiments No. 76 to No. 86)

Into a stainless steel-made polymerization reactor of 100-liter capacity equipped with a stirrer were introduced 40 kg of deionized water, 2.2 kg of sodium laurylsulfate, 3.0 kg of cetyl alcohol, 20 g of α,α'-azobisdimethyl valeronitrile and 20 kg of vinyl chloride monomer and the polymerization reaction was performed under agitation at 50° C. for 7 hours.

After completion of the polymerization reaction, the polymerizate slurry was discharged out of the polymerization reactor and a remover solution prepared according to one of the formulations shown in Table 2 was applied to the polymer scale deposited on the reactor walls in a coating amount of 30 g/m² followed by standing for a length of time as indicated in the table and then washing down of the polymer scale with water. Table 2 also gives the amount of the polymer scale left unremoved on the reactor walls after this washing in each Experiment.

EXAMPLE 8

(Experiments No. 87 to No. 97)

Into a stainless steel-made polymerization reactor of 100-liter capacity equipped with a stirrer were introduced 40 kg of deionized water, 5.8 kg of n-butyl acrylate, 13.6 kg of methyl methacrylate, 0.3 kg of acrylic acid, 0.3 kg of methacrylic acid, 0.1 kg of sodium dodecylbenzene sulfonate, 0.7 kg of polyoxyethylene nonyl phenyl ether and 20 g of ammonium persulfate followed by temperature elevation to 60° C. and then additional introduction of 20 g of sodium hydrogensulfite and the polymerization reaction was performed under agitation at 60° C. for 6 hours.

After completion of the polymerization reaction, the polymerizate slurry was discharged out of the polymerization reactor and a remover solution prepared according to one of the formulations shown in Table 2 was applied to the polymer scale deposited on the reactor walls in a coating amount of 40 g/m² followed by standing for a length of time as indicated in the table and then washing down of the polymer scale with water. Table 2 also gives the amount of the polymer scale left unremoved on the reactor walls after this washing in each Experiment.

TABLE 2

| Exp. No. | Remover solution Good solvent (A) | Poor solvent (B) | (A)/(B) weight ratio | Solid paraffin, % by weight | Emulsifying agent (% by weight) | Acid or alkali (% by weight) | Cellulose derivative | Viscosity at 20° C., cps | Standing time after application of remover, minutes | Scale left after washing, g/m² |
|---|---|---|---|---|---|---|---|---|---|---|
| 51 | — | — | — | — | — | — | — | — | — | 1050 |
| 52 | CH₂Cl₂ | — | — | — | — | — | EC | 10 | 60 | 150 |
| 53 | CH₂Cl₂ | — | — | 0.5 | — | — | EC | 10 | 30 | 150 |
| 54 | CH₂Cl₂ | — | — | 0.5 | DBS—Na(1) | — | EC | 10 | 20 | 150 |
| 55 | CH₂Cl₂ | — | — | 0.5 | DBS—Na(1) | HCOOH(10) | EC | 10 | 10 | 0 |
| 56 | CH₂Cl₂ | — | — | — | DBS—Na(1) | HCOOH(10) | EC | 10 | 60 | 0 |

TABLE 2-continued

| Exp. No. | Good solvent (A) | Poor solvent (B) | (A)/(B) weight ratio | Solid paraffin, % by weight | Emulsifying agent (% by weight) | Acid or alkali (% by weight) | Cellulose derivative | Viscosity at 20° C., cps | Standing time after application of remover, minutes | Scale left after washing, g/m² |
|---|---|---|---|---|---|---|---|---|---|---|
| 57 | CH₂Cl₂ | — | — | — | DBS—Na(1) | HCOOH(10) | EC | 10 | 30 | 2 |
| 58 | CH₂Cl₂ | — | — | 0.5 | — | HCOOH(10) | EC | 10 | 40 | 0 |
| 59 | CH₂Cl₂ | — | — | 0.5 | — | HCOOH(10) | EC | 10 | 20 | 1 |
| 60 | CH₂Cl₂ | MeOH | 70/30 | 0.3 | LSA(2) | Cl—AcOH(5) | HPMC | 50 | 10 | 0 |
| 61 | CH₂Cl₂ | EtOH | 50/50 | 0.3 | LSA(2) | Cl—AcOH(5) | HPMC | 50 | 10 | 0 |
| 62 | MIBK | MeOH | 50/50 | 0.3 | LAS(1) | AcOH(10) | HPMC | 50 | 10 | 0 |
| 63 | TCE | n-C₇H₁₆ | 50/50 | 0.5 | LAS—Na(1) | HCOOH(12) | NC | 20 | 10 | 0 |
| 64 | — | — | — | — | — | — | — | — | — | 900 |
| 65 | TCE | — | — | — | — | — | EC | 50 | 60 | 10 |
| 66 | TCE | — | — | — | — | — | EC | 50 | 10 | 30 |
| 67 | TCE | — | — | 0.5 | — | — | EC | 50 | 20 | 10 |
| 68 | TCE | — | — | — | — | HCOOH(10) | EC | 50 | 30 | 0 |
| 69 | TCE | — | — | 0.5 | — | HCOOH(10) | EC | 50 | 30 | 0 |
| 70 | TCE | — | — | 0.5 | — | HCOOH(10) | EC | 50 | 10 | 1 |
| 71 | TCE | — | — | 0.5 | — | HCOOH(10) | EC | 50 | 10 | 0 |
| 72 | CH₂Cl₂ | MeOH | 80/20 | 0.3 | DBS—Na(1) | HCOOH(10) | EC | 50 | 10 | 0 |
| 73 | CH₂Cl₂ | PhOH | 80/20 | 0.3 | DBS—Na(1) | HCOOH(10) | HPMC | 30 | 10 | 0 |
| 74 | C₆H₆ | EtOH | 70/30 | 0.3 | LS—Na(1) | Cl—AcOH(5) | HPMC | 30 | 10 | 0 |
| 75 | EDC | EtOH | 70/30 | 0.3 | LS—Na(1) | Cl—AcOH(5) | HPMC | 30 | 10 | 0 |
| 76 | — | — | — | — | — | — | — | — | — | 1100 |
| 77 | THF | MeOH | 95/5 | — | — | — | HPMC | 80 | 30 | 80 |
| 78 | THF | MeOH | 95/5 | — | — | — | HPMC | 80 | 20 | 130 |
| 79 | THF | MeOH | 95/5 | 0.8 | — | — | HPMC | 80 | 20 | 50 |
| 80 | THF | MeOH | 95/5 | — | — | MEA(5) | HPMC | 80 | 30 | 3 |
| 81 | THF | MeOH | 95/5 | 0.8 | — | MEA(5) | HPMC | 80 | 20 | 1 |
| 82 | THF | MeOH | 95/5 | 0.8 | LS—Na(1.5) | MEA(5) | HPMC | 80 | 10 | 0 |
| 83 | CH₂Cl₂ | MeOH | 90/10 | 0.5 | LS—Na(1.5) | EDA(5) | EC | 100 | 10 | 0 |
| 84 | EDC | n-C₇H₁₆ | 90/10 | 0.5 | DAS—Na(1) | EDA(5) | NC | 100 | 10 | 0 |
| 85 | MEK | EtOH | 90/10 | 0.5 | DAS—Na(1) | NH₄OH(1) | MC | 50 | 10 | 0 |
| 86 | CHN | MeOH | 90/10 | 0.5 | DAS—Na(1) | NaOH(3) | CEC | 30 | 10 | 0 |
| 87 | — | — | — | — | — | — | — | — | — | 950 |
| 88 | CH₂Cl₂ | MeOH | 90/10 | — | — | — | HPMC | 50 | 60 | 15 |
| 89 | CH₂Cl₂ | MeOH | 90/10 | — | — | — | HPMC | 50 | 20 | 60 |
| 90 | CH₂Cl₂ | MeOH | 90/10 | 0.5 | — | — | HPMC | 50 | 20 | 10 |
| 91 | CH₂Cl₂ | MeOH | 90/10 | — | — | MEA(3) | HPMC | 50 | 30 | 2 |
| 92 | CH₂Cl₂ | MeOH | 90/10 | 0.5 | — | MEA(3) | HPMC | 50 | 30 | 0 |
| 93 | CH₂Cl₂ | MeOH | 90/10 | 0.5 | — | MEA(3) | HPMC | 50 | 10 | 1 |
| 94 | CH₂Cl₂ | MeOH | 90/10 | 0.5 | DBS—Na(1) | MEA(3) | HPMC | 50 | 10 | 0 |
| 95 | THF | — | — | 0.5 | DBS—Na(1) | NH₄OH(1) | MC | 50 | 10 | 0 |
| 96 | THF | — | — | 0.5 | DBS—Na(1) | MMA(1) | MC | 50 | 10 | 0 |
| 97 | THF | — | — | 0.5 | DBS—Na(1) | MIPA(1) | MC | 50 | 10 | 0 |

What is claimed is:

1. A method for removing polymer scale from the reactor walls after completion of a run of polymerization of an ethylenically unsaturated polymerizable monomer or a monomer mixture in an aqueous medium which comprises applying a scale removed solution containing a soluble cellulose derivative selected from the group consisting of methyl celluloe, ethyl cellulose, hydroxypropyl methyl cellulose, carboxymethyl cellulose, carboxyethyl cellulose, nitrocellulose and cellulose acetate, dissolved therein to the polymer scale deposited on the reactor walls and washing down the polymer scale with a washing liquid.

2. The method as claimed in claim 1 wherein the scale remover solution has a viscosity of at least 3 centipoise at 20° C.

3. The method as claimed in claim 1 wherein the scale remover solution is applied to the polymer scale in a coating amount in the range from 0.1 to 500 g/m².

4. The method as claimed in claim 1 wherein the step of washing down of the polymer scale with the washing liquid follows a standing period of 5 to 30 minutes of the polymer scale after application of the scale remover solution.

5. The method as claimed in claim 1 wherein the scale remover solution further contains an auxiliary additive selected from the group consisting of acids, alkalis, paraffins and emulsifying agents.

6. The method as claimed in claim 5 wherein the acid is selected from the group consisting of formic acid, acetic acid, propionic acid, salicylic acid, butyric acid, benzoic acid, cinnamic acid, monochloroacetic acid, dichloroacetic acid and trichloroacetic acid.

7. The method as claimed in claim 5 wherein the scale remover solution contains an acid in a concentration of 0.1 to 15% by weight.

8. The method as claimed in claim 7 wherein the scale remover solution contains an alkali in a concentration in the range from 0.1 to 15% by weight.

9. The method as claimed in claim 7 wherein the paraffin has a melting point in the range from 40° to 75° C.

10. The method as claimed in claim 5 wherein the alkali is selected from the group consisting of ammonia, sodium hydroxide, potassium hydroxide, monoethanolamine, diethanolamine, triethanolamine, ethyl ethanolamine, dimethyl ethanolamine, acetyl ethanolamine, aminoethyl ethanolamine, diisopropyl ethanolamine, monoisopropanolamine, diisopropanolamine, triisopropanolamine, ethylene diamine, monoethylamine, diethylene triamine, cyclohexyl amine, monomethyl amine, hydrazine, and diallyl amine.

11. A scale remover solution for removing polymer scale from the reactor walls after completion of a run of polymerization of an ethylenically unsaturated monomer or a monomer mixture in an aqueous medium which comprises
(a) a soluble cellulose derivative selected from the group consisting of methyl cellulose, ethyl cellulose, hydroxypropyl methyl cellulose, carboxymethyl cellulose, carboxyethyl cellulose, nitrocellulose and cellulose acetate,
(b) a solvent for the soluble cellulose derivative, and
(c) an additive selected from the group consisting of acids, alkalis, paraffins and emulsifying agents.

* * * * *